United States Patent
Weber et al.

(10) Patent No.: US 9,546,271 B2
(45) Date of Patent: Jan. 17, 2017

(54) WEATHER-PROOF THERMOPLASTIC MOULDING COMPOUNDS WITH IMPROVED TOUGHNESS ON THE BASIS OF STYRENE COPOLYMERS AND POLYAMIDES

(71) Applicant: STYROLUTION EUROPE GMBH, Frankfurt am Main (DE)

(72) Inventors: Martin Weber, Maikammer (DE); Marko Blinzler, Mannheim (DE)

(73) Assignee: STYROLUTION EUROPE GMBH (DE)

( * ) Notice: Subject to any disclaimer, the term of this patent is extended or adjusted under 35 U.S.C. 154(b) by 36 days.

(21) Appl. No.: 14/371,014

(22) PCT Filed: Dec. 28, 2012

(86) PCT No.: PCT/EP2012/077054
§ 371 (c)(1),
(2) Date: Jul. 8, 2014

(87) PCT Pub. No.: WO2013/104528
PCT Pub. Date: Jul. 18, 2013

(65) Prior Publication Data
US 2015/0087784 A1    Mar. 26, 2015

(30) Foreign Application Priority Data

Jan. 11, 2012 (EP) .................................... 12150749

(51) Int. Cl.
*C08L 77/02* (2006.01)
*C08J 3/00* (2006.01)
*C08L 25/12* (2006.01)
*C08L 51/04* (2006.01)
*C08L 77/00* (2006.01)

(52) U.S. Cl.
CPC ................ *C08L 77/02* (2013.01); *C08J 3/005* (2013.01); *C08L 51/04* (2013.01); *C08L 77/00* (2013.01); *C08J 2377/02* (2013.01); *C08J 2421/00* (2013.01); *C08J 2425/08* (2013.01); *C08J 2425/12* (2013.01); *C08J 2453/00* (2013.01); *C08L 2201/08* (2013.01); *C08L 2203/12* (2013.01); *C08L 2203/20* (2013.01); *C08L 2205/02* (2013.01); *C08L 2205/035* (2013.01)

(58) Field of Classification Search
None
See application file for complete search history.

(56) References Cited

U.S. PATENT DOCUMENTS

| 4,224,419 A | 9/1980 | Swoboda et al. |
| 4,537,949 A | 8/1985 | Schmidt et al. |
| 4,540,772 A | 9/1985 | Pipper et al. |
| 4,605,699 A | 8/1986 | Mitulla et al. |
| 4,634,734 A | 1/1987 | Hambrecht et al. |
| 5,272,236 A | 12/1993 | Lai et al. |
| 5,804,629 A | 9/1998 | Weber et al. |
| 6,218,467 B1 | 4/2001 | Wicker et al. |
| 6,423,817 B1 | 7/2002 | Weinerth et al. |
| 6,812,323 B1 | 11/2004 | Breiner et al. |
| 2003/0153677 A1 | 8/2003 | Warth et al. |
| 2003/0166761 A1 | 9/2003 | Weber et al. |
| 2007/0161746 A1* | 7/2007 | Weber .............................. 525/66 |
| 2011/0306701 A1* | 12/2011 | Weber et al. ................ 523/351 |
| 2011/0319550 A1 | 12/2011 | Weber et al. |

FOREIGN PATENT DOCUMENTS

| DE | 1260135 B | 2/1968 |
| DE | 2826925 A1 | 1/1980 |
| DE | 3149358 A1 | 6/1983 |
| DE | 3414118 A1 | 10/1985 |
| DE | 4407485 A1 | 9/1995 |
| DE | 19812135 A1 | 9/1999 |
| DE | 10024935 A1 | 11/2001 |
| EP | 0038094 A2 | 10/1981 |
| EP | 0038582 A2 | 10/1981 |
| EP | 0039524 A1 | 11/1981 |
| EP | 0129195 A2 | 12/1984 |
| EP | 0129196 A2 | 12/1984 |
| EP | 0202214 A2 | 11/1986 |
| EP | 0402528 A2 | 12/1990 |
| EP | 0784080 A1 | 7/1997 |
| EP | 0946644 B1 | 10/1999 |
| GB | 1124911 A | 8/1968 |
| WO | 95/28443 A1 | 10/1995 |
| WO | 99/41297 A1 | 8/1999 |
| WO | 01/42362 A1 | 6/2001 |
| WO | 2005/040281 A1 | 5/2005 |
| WO | 2005/071013 A1 | 8/2005 |
| WO | 2010/089245 A1 | 8/2010 |
| WO | 2010/089258 A1 | 8/2010 |
| WO | WO 2010/089258 | * 8/2010 |

OTHER PUBLICATIONS

International Preliminary Report on Patentability in Application No. PCT/EP2012/077054 dated Jul. 24, 2014.
R.A. Kudva et al.: "Compatibilization of Nylon 6/ABS Blends Using Glycidyl Methacrylate/Methyl Methacrylate Copolymers," Polymer, vol. 39, No. 12, pp. 2447-2460, 1998.

(Continued)

Primary Examiner — Jeffrey Mullis
(74) Attorney, Agent, or Firm — J.A. Lindeman & Co., PLLC

(57) ABSTRACT

A thermoplastic molding compound that has proved to be extremely weather-resistant and low-emission containing the following components: A) 3-77% by weight of one or more styrene copolymers, component A; B) 15-89% by weight of one or more polyamides, component B; C) 5-50% by weight of two or more graft rubbers without olefinic double bonds in the rubber phase, component C; D) 1-25% by weight of a terpolymer of styrene, acrylonitrile and maleic anhydride, component D; E) 2-30% by weight of rubber based on olefinic monomers, component E; F) 0-50% by weight of fibrous or particulate filler or mixtures thereof, component F; G) 0-40% by weight of further additives, component G.

11 Claims, No Drawings

(56) References Cited

OTHER PUBLICATIONS

R.A. Kudva et al.: "Properties of Compatibilized Nylon 6/ABS Blends Part II. Effects of Compatibilizer Type and Processing History," Polymer, vol. 41, pp. 239-258, 2000.

C. Lacasse et al.: "Interface/Morphology/Property Relationships in Polyamide-6/ABS Blends," Advances in Polymer Technology, vol. 18, No. 3, pp. 255-165, 1999.

C.W. Lee et al.: "Morphological Changes in Nylon-6/Acrylonitrile-Butadiene-Styrene Reactive Blend," Journal of Applied Polym. Sci. vol. 64, pp. 1595-1604, 1997.

B. Majumdar et al.: "Control of the Morphology of Polyamide/Styrene-Acrylonitrile Copolymer Blends via Reactive Compatibilizers," Polymer, vol. 35, No. 20, pp. 4263-4279, 1994.

V.J. Triacca et al.: "Reactive Compatibilization of Blends of Nylon 6 and ABS Materials," Polymer, vol. 32, No. 8, pp. 1401-1413, 1991.

International Search Report in Application No. PCT/EP2012/077054 dated Jul. 18, 2013.

L.A. Utracki: "Polymer Alloys and Blends: Thermodynamics and Rheology," Table of Contents Hanser Publishers (1989).

* cited by examiner

WEATHER-PROOF THERMOPLASTIC MOULDING COMPOUNDS WITH IMPROVED TOUGHNESS ON THE BASIS OF STYRENE COPOLYMERS AND POLYAMIDES

The present invention relates to thermoplastic molding compositions comprising at least one polyamide, at least one styrene copolymer, at least one graft rubber without olefinic double bonds in the rubber phase, and at least one terpolymer of styrene, acrylonitrile, and maleic anhydride.

Stabilized thermoplastic molding compositions based on acrylonitrile-butadiene-styrene (ABS) copolymers have been known for years and can be broadly used on account of a profile of properties they possess that is favorable in numerous applications. Also known in the literature are thermoplastic molding compositions which comprise polyamides, graft rubbers, and at least one styrene-based copolymer (EP-A 0 202 214, EP-A 0 784 080, EP-A 0 402 528, WO 2005/071013). Such thermoplastic molding compositions find use especially in connection with the production of moldings, shaped parts, foils, fibers, and foams—the shaped parts, for example, can be used as automotive components.

Binary blends of polyamides and styrene copolymers have very poor toughness because of the incompatibility between polyamide and SAN (styrene-acrylonitrile copolymer matrix). The use of functionalized SAN polymers allows a significant boost to the toughness in polyamide/styrene copolymer mixtures. Such products, moreover, exhibit advantageous properties, such as high impact toughness, high flowability, and chemicals resistance.

Investigations of the in situ compatibilization in styrene copolymer/polyamide mixtures are known from the literature (see V. J. Triacca, Polymer 32, 1401 (1991); B. Majundar, Polymer 35, 4263 (1994); C. W. Lee, J. Appl. Polym. Sci., 64, 1595 (1997); R. A. Kudva, Polymer 39, 2447 (1998); C. Lacasse, Adv. Polym. Techn. 18, 255 (1999); R. A. Kudva, Polymer 41, 239, 2000).

The present invention relates in particular to a thermoplastic molding composition which comprises (or consists of) the following components:
A) 3 to 77 wt % of one or more styrene copolymers, as component A,
B) 15 to 89 wt % of one or more polyamides, as component B,
C) 5 to 50 wt % of two or more graft rubbers without olefinic double bonds in the rubber phase, as component C,
D) 1 to 25 wt % of a terpolymer of styrene, acrylonitrile, and maleic anhydride, as component D,
E) 2 to 30 wt % of rubber based on olefinic monomers, as component E,
F) 0 to 50 wt % of fibrous or particulate filler or mixtures thereof, as component F,
G) 0 to 40% of further adjuvants, as component G.

The sum total of components A to G here makes 100 percent by weight.

The mixture used as component C), made up of at least 2 different graft rubbers, consists more particularly of at least two rubbers which differ in their graft shells. The mixture used as component C) frequently consists of 2 or 3 different graft rubbers.

In this case, preferably, the first graft rubber comprises a graft shell of styrene and acrylonitrile. In this case the second graft rubber preferably comprises a graft shell which comprises glycidyl methacrylate. More particularly the second graft rubber comprises a graft shell which consists of glycidyl methacrylate and methyl methacrylate.

The invention also relates to a thermoplastic molding composition comprising:
A) 10 to 70 wt % of one or more styrene copolymers, as component A,
B) 20 to 60 wt % of one or more polyamides, as component B,
C) 14 to 35 wt % of two or more graft rubbers without olefinic double bonds in the rubber phase, as component C,
D) 2 to 10 wt % of a terpolymer of styrene, acrylonitrile, and maleic anhydride, as component D,
E) 3 to 30 wt % of rubber based on olefinic monomers, as component E,
F) 0 to 50 wt % of fibrous or particulate filler or mixtures thereof, as component F,
G) 0 to 40% of further adjuvants, as component G,
where the mixture used as component C) consists of at least two different graft rubbers which differ in their graft shells. Reference is made to the above description of the graft rubbers.

The invention also relates to a thermoplastic molding composition comprising:
A) 10 to 70 wt % of a SAN copolymer, as component A,
B) 20 to 60 wt % of one or more polyamides, as component B,
C) 14 to 35 wt % of two or more graft rubbers without olefinic double bonds in the rubber phase, as component C,
D) 2 to 10 wt % of a styrene-acrylonitrile-maleic anhydride terpolymer as component D,
E) 3 to 30 wt % of rubber based on olefinic monomers, as component E,
F) 0 to 50 wt % of fibrous or particulate filler or mixtures thereof, as component F,
G) 0 to 40% of further adjuvants, as component G,
where the mixture used as component C) consists of at least two different graft rubbers which differ only in their graft shells.

The invention also relates to a thermoplastic molding composition where the average particle diameter of component C is between 50 to 800 nm.

The invention also relates to a thermoplastic molding composition where two different rubber components are used as component C, at least one of the rubbers having a bimodal particle size distribution.

The invention also relates to a thermoplastic molding composition where components D and E are used in a weight ratio of 4:1 to 0.25:1.

The invention also relates to a thermoplastic molding composition where component B has from 0.05 to 0.5 wt % of triacetonediamine (TAD) end groups.

Also provided is a process for producing thermoplastic molding compositions as described above, characterized in that components A, B, C, D, and E, and also optionally F and G, are mixed with one another in any order at temperatures of 100 to 300° C. under a pressure of 1 to 50 bar and the mixture is subsequently kneaded and extruded.

Also provided is a process for producing thermoplastic molding compositions where first of all a part of component D is premixed with a part of component B to form a masterbatch in a ratio of 1:1 to 1:2 and said masterbatch is subsequently mixed with further components A, B, C, D, and E, and also optionally F and G, to give the thermoplastic molding composition.

The invention also relates to the use of thermoplastic molding compositions for producing moldings, foils, or fibers. The thermoplastic molding compositions are often used to produce moldings for automotive components or parts of electronic devices.

Also provided are moldings, fibers, or foils comprising or consisting of a thermoplastic molding composition as described above.

The invention also relates to processes for preparing these molding compositions, to their use for producing moldings (e.g., household articles, electronic components, medical devices, automotive components), foils, or fibers, and also to these moldings, foils and fibers themselves. Through the specific selection, essential to the invention, of the individual components and of their specific proportions, the molding compositions of the invention exhibit improved weathering resistance as compared with their known counterparts, in other words improved heat resistance, light resistance and/or oxygen resistance. The invention relates, moreover, to the use of the molding compositions for producing moldings, as for example for household articles, electronic components, medical engineering devices, and automotive components. The subject matter, processes and uses of the invention will be described in more detail hereinafter.

The molding compositions of the invention comprise the components preferably, based on the total weight (mass) of components A, B, C, D, E (required components) and optionally F and G (optional components), in amounts such that the total weight gives a total of 100 percent by weight.

The invention relates more particularly to a thermoplastic molding composition which comprises:

a) 3 to 77 wt %, preferably 10 to 70 wt % of component A,
b) 15 to 89 wt %, preferably 20 to 60 wt % of component B,
c) 5 to 50 wt %, preferably 14 to 35 wt % of component C,
d) 1 to 25 wt %, preferably 2 to 10 wt % of component D,
e) 2 to 30 wt %, preferably 3 to 20 wt % of component E,
f) 0 to 50 wt %, preferably 0 to 30 wt % of component F,
g) 0 to 40 wt %, preferably 0 to 20 wt % of component G.

A molding composition of the invention consists of, for example, based on the total weight of all of the components, which as a total weight make up in total 100 percent by weight:

a) 15 to 25 wt % of component A,
b) 35 to 45 wt % of component B,
c) 14 to 32 wt % of component C,
d) 2 to 6 wt % of component D,
e) 2 to 5 wt % of component E,
f) 0 to 20 wt % of component F,
g) 0 to 20 wt % of component G.

Suitable compatibilizers are styrene-acrylonitrile-maleic anhydride (MA) terpolymers, styrene-N-phenylmaleimide-maleic anhydride terpolymers, methyl methacrylate-maleic anhydride (EP-A 0 946 644). In general the amino and/or carboxyl end groups of the polyamides react with the functional groups of the stated co- and terpolymers, forming in situ copolymers which bring about compatibility between the styrene copolymer phase and the polyamide phase. Such polymer mixtures with modified interface are identified generally as polymer alloys (L. A. Utracki, "Polymer Alloys and Blends", Hanser Publishers, Munich Vienna New York, 1989).

For many applications, the existing molding compositions comprising styrene copolymer and polyamide have insufficient weathering resistance (UV stability and heat aging resistance). Improving the weathering stability can be achieved by using, for example, impact modifiers which have no olefinic double bonds. As well as higher physical costs, the use of such modifiers may also result in a significant reduction in the notched impact strength at low temperatures. Furthermore, polyamides with sterically hindered piperidine end groups may be used as HALS stabilizers. The use of the molding composition comprising, for example, triacetonediamine (TAD), however, leads, under unfavorable processing conditions, to a drop in the damaging energy at low temperatures.

WO 2005/040281 discloses thermoplastic molding compositions which comprise polyamides having TAD end groups, styrene-acrylonitrile-maleic anhydride terpolymers, graft rubbers, and frequently phthalic anhydride. The molding compositions described do not have an optimum profile of properties for all applications.

WO 2010/089258 discloses weathering-stable molding compositions based on polyamide and styrene copolymers without rubbers comprising olefinic double bonds, where an improvement was achieved in the weathering stability and where the fracture energy depended little on the processing temperature. In some cases, however, the molding compositions exhibit low notched impact strength at −30° C.

It is an object of the present invention, therefore, to provide thermoplastic molding compositions based on styrene copolymers and polyamides that feature good weathering resistance and good notched impact strength at −30° C.

This object is fulfilled by the molding compositions specified at the outset. Surprisingly, components produced from these products also exhibit good surface properties and reduced emissions tendency.

As to Component A:

As component A, the thermoplastic molding compositions of the invention comprise 3 to 77 wt % of at least one styrene copolymer. Styrene copolymers are to be understood as SAN or other rubber-free styrene copolymers. As component A, the thermoplastic molding compositions comprise in particular one or more styrene copolymers which have no units derived from maleic anhydride. In the copolymers, besides styrene, there may be any suitable comonomers present. The copolymer is preferably a styrene-acrylonitrile copolymer or α-methylstyrene-acrylonitrile copolymer.

As component A of the thermoplastic matrix M, it is possible in principle to use all styrene-acrylonitrile copolymers, α-methylstyrene-acrylonitrile copolymers, or mixtures thereof that are known to the skilled person and are described in the literature, provided the mixtures thereof have an intrinsic viscosity IV (measured to DIN 53727 at 25° C. as a 0.5 wt % strength solution in dimethylformamide; this measurement method also applies for all of the intrinsic viscosities IV specified hereinafter) of less than or equal to 105 ml/g, often less than 85 ml/g.

Preferred components A are composed of 50 to 90 wt %, preferably 60 to 80 wt %, more particularly 65 to 78 wt %, of styrene and 10 to 50 wt %, preferably 20 to 40 wt %, more particularly 22 to 35 wt %, of acrylonitrile and also of 0 to 5 wt %, preferably 0 to 4 wt %, more particularly 0 to 3 wt %, of further monomers, the wt % being based in each case on the weight of component A, and together making 100 wt %.

Additionally preferred components A are composed of 50 to 90 wt %, preferably 60 to 80 wt %, more particularly 65 to 78 wt %, of α-methylstyrene and 10 to 50 wt %, preferably 20 to 40 wt %, more particularly 22 to 35 wt %, of acrylonitrile, and also of 0 to 5 wt %, preferably 0 to 4 wt %, more particularly 0 to 3 wt %, of further monomers, the wt % being based in each case on the weight of component A, and together making 100 wt %.

Likewise preferred components A are mixtures of these styrene-acrylonitrile copolymers and of these α-methylstyrene-acrylonitrile copolymers.

Abovementioned further monomers which can be used are all copolymerizable monomers other than maleic anhydride, examples being p-methylstyrene, tert-butylstyrene, vinylnaphthalene, alkyl acrylates and/or alkyl methacrylates, as for example those having $C_1$ to $C_8$ alkyl radicals, N-phenylmaleimide, or mixtures thereof.

The copolymers of component A may be prepared by methods which are known per se. They may be prepared, for example, by radical polymerization, more particularly by emulsion, suspension, solution, or bulk polymerization.

The styrene copolymers used as component A are preferably rubber-free.

As to Component B:

As component B, the thermoplastic molding compositions of the invention comprise 15 to 89 wt % of at least one thermoplastic polyamide. These polyamides frequently contain, based on the overall component B, 0.05 to 0.5 wt %, preferably 0.1 to 0.2 wt %, of triacetonediamine (TAD) end groups.

Component B may comprise TAD-free polyamides, TAD-containing polyamides, or else mixtures of polyamides having TAD end groups with polyamides without TAD end groups. Overall, with preference, based on component B, there may be 0.1 to 0.2 wt % of triacetonediamine end groups present. There are preferably 0.14 to 0.18 wt % of TAD end groups present, more particularly 0.15 to 0.17 wt % of TAD end groups.

Often used as component B is a polyamide at least one of whose end groups can be derived from the piperidine compound TAD. Mixtures of two or more different polyamides may also be used as component B. For example, polyamides with a different parent structure but the same end group may be used. It is also possible, however, to use polyamides having the same framework and having end groups which derive from different piperidine compounds.

It is possible, furthermore, to use mixtures of polyamides which contain different amounts of end groups deriving from the piperidine compounds.

Polyamides are homopolymers or copolymers of synthetic, long-chain polyamides, which have amide groups repeatingly in the main polymer chain, as an essential constituent. Examples of such polyamides are nylon 6 (polycaprolactam), nylon 6,6 (polyhexamethyleneadipamide), nylon 4,6 (polytetramethyleneadipamide), nylon 5,10 (polypentamethyleneadipamide), nylon 6,10 (polyhexamethylenesebacamide), nylon 7 (polyenantholactam), nylon 11 (polyundecanolactam), and nylon 12 (polydodecanolactam). As is known, these polyamides carry the generic name nylon.

Polyamides may be prepared in principle by two processes.

In the case of the polymerization from dicarboxylic acids and diamines, and in the case of the polymerization from amino acids, the amino and carboxyl end groups of the starting monomers or starting oligomers react with one another to form an amide group and water. The water may be subsequently removed from the polymer material. In the case of the polymerization from carboxamides, the amino and amide end groups of the starting monomers or starting oligomers react with one another to form an amide group and ammonia. The ammonia may subsequently be removed from the polymer material.

Examples of suitable starting monomers or starting oligomers for preparing polyamides include the following:

(1) $C_2$ to $C_{20}$, preferably $C_3$ to $C_{18}$ amino acids, such as 6-aminocaproic acid, 11-aminoundecanoic acid, and also their dimers, trimers, tetramers, pentamers, or hexamers;

(2) $C_2$ to $C_{20}$ amino acid amides, such as 6-aminocaproamide, 11-aminoundecanamide, and their dimers, trimers, tetramers, pentamers, or hexamers;

(3) reaction products of
 (3a) $C_2$ to $C_{20}$, preferably $C_2$ to $C_{12}$ alkylenediamines, such as tetramethylenediamine or preferably hexamethylenediamine,
with
 (3b) a $C_2$ to $C_{20}$, preferably $C_2$ to $C_{14}$ aliphatic dicarboxylic acid, such as sebacic acid, decanedicarboxylic acid, or adipic acid,
and also their dimers, trimers, tetramers, pentamers, or hexamers;

(4) reaction products of (3a) with
 (4b) a $C_8$ to $C_{20}$, preferably $C_8$ to $C_{12}$ aromatic dicarboxylic acid or derivatives thereof, as for example chlorides, such as 2,6-naphthalenedicarboxylic acid, preferably isophthalic acid or terephthalic acid,
and also their dimers, trimers, tetramers, pentamers, or hexamers;

(5) reaction products of (3a) with
 (5b) a $C_9$ to $C_{20}$, preferably $C_9$ to $C_{18}$ arylaliphatic dicarboxylic acid or derivatives thereof, as for example chlorides, such as o-, m-, or p-phenylenediacetic acid,
and also their dimers, trimers, tetramers, pentamers, or hexamers;

(6) reaction products of
 (6a) $C_6$ to $C_{20}$, preferably $C_6$ to $C_{10}$ aromatic diamines, such as m- or p-phenylenediamine, with (3b),
and also their dimers, trimers, tetramers, pentamers, or hexamers;

(7) reaction products of
 (7a) $C_7$ to $C_{20}$, preferably $C_8$ to $C_{18}$ arylaliphatic diamines, such as m- or p-xylylenediamine, with (3b),
and also their dimers, trimers, tetramers, pentamers, or hexamers;

(8) monomers or oligomers of a $C_2$ to $C_{20}$, preferably $C_2$ to $C_{18}$ arylaliphatic or preferably aliphatic lactam, such as enantholactam, undecanolactam, dodecanolactam, or caprolactam,
and also homopolymers, copolymers or mixtures of such starting monomers or starting oligomers.

Preferred here are those starting monomers or starting oligomers which on polymerization result in the polyamides nylon 6, nylon 6,6, nylon 4,6, nylon 5,10, nylon 6,10, nylon 7, nylon 11, nylon 12, more particularly nylon 6 and nylon 66.

The triacetonediamine (TAD) end groups optionally present derive from 4-amino-2,2,6,6-tetramethylpiperidine. The TAD may be attached to the polyamide via an amino or carboxyl group. The compound in question thus may also, for example, be 4-carboxy-2,2,6,6-tetramethylpiperidine.

The preparation of the polyamides B is known per se or can take place in accordance with known processes. Thus the polymerization or polycondensation of the starting monomers may be performed, for example, in the presence of the piperidine compounds, under customary process conditions, and the reaction may take place continuously or batchwise.

The piperidine compounds may alternatively—where present—also be combined with a chain transfer agent, of the kind typically used for preparing polyamides. Details of suitable processes are found, for example, in WO 1995/28443, WO 1999/41297 or DE-A 198 12 135. The TAD compound is attached to the polyamide by reaction of at least one of the amide-forming groups $R^7$. The secondary amino groups of the piperidine ring systems do not react here, owing to steric hindrance.

It is also possible to use polyamides which have been prepared by copolycondensation of two or more of the abovementioned monomers or their components, examples being copolymers of adipic acid, isophthalic acid, or terephthalic acid and hexamethylenediamine, or copolymers of caprolactam, terephthalic acid, and hexamethylenediamine. Partially aromatic copolyamides of these kinds comprise 40 to 90 wt % of units deriving from terephthalic acid and hexamethylenediamine. A small proportion of the terephthalic acid, preferably not more than 10 wt %, of the entire aromatic dicarboxylic acids used may be replaced by isophthalic acid or other aromatic dicarboxylic acids, preferably those in which the carboxyl groups are in para-position.

One partially aromatic polyamide is Nylon 9T, which derives from nonanediamine and terephthalic acid.

Other suitable monomers include cyclic diamines such as those of the general formula (V)

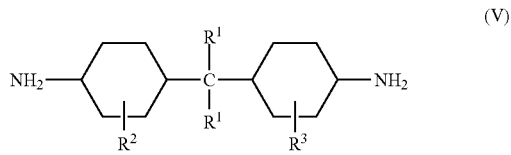

in which
$R^1$ is hydrogen or a $C_1$-$C_4$ alkyl group,
$R^2$ is a $C_1$-$C_4$ alkyl group or hydrogen, and
$R^3$ is a $C_1$-$C_4$ alkyl group or hydrogen.

Particularly preferred diamines V are bis(4-aminocyclohexyl)methane, bis(4-amino-3-methylcyclohexyl)methane, 2,2-bis(4-aminocyclohexyl)propane, or 2,2-bis(4-amino-3-methylcyclohexyl)propane.

Other diamines V include 1,3- or 1,4-cyclohexanediamine or isophoronediamine. Besides the units deriving from terephthalic acid and hexamethylenediamine, the partially aromatic copolyamides comprise units which derive from ε-caprolactam and/or units which derive from adipic acid and hexamethylenediamine.

The fraction of units deriving from ε-caprolactam is up to 50 wt %, preferably 20 to 50 wt %, more particularly 25 to 40 wt %, while the fraction of units deriving from adipic acid and hexamethylenediamine is up to 60 wt %, preferably 30 to 60 wt %, and more particularly 35 to 55 wt %.

The copolyamides may also comprise both units of ε-caprolactam and units of adipic acid and hexamethylenediamine; in this case it should be ensured that the fraction of units which are free from aromatic groups is at least 10 wt %, preferably at least 20 wt %. The ratio of the units deriving from ε-caprolactam and from adipic acid and hexamethylenediamine is not subject to any particular restriction.

Polyamides which have proven particularly advantageous for numerous end-use applications are polyamides with 50 to 80, more particularly 60 to 75 wt % of units deriving from terephthalic acid and hexamethylenediamine, and 20 to 50, preferably 25 to 40 wt % of units deriving from ε-caprolactam.

The partially aromatic copolyamides may be prepared, for example, by the method described in EP-A-129 195 and EP-A-129 196.

Preferred partially aromatic polyamides are those containing less than 0.555 wt % of triamine units, more particularly of units of dihexamethylenetriamine. Particularly preferred are those partially aromatic polyamides having triamine contents of 0.3 wt % or less.

Preference is given to linear polyamides with a melting point above 200° C.

Preferred polyamides are polyhexamethyleneadipamide, polyhexamethylenesebacamide, and polycaprolactam, and also polyamide 6/6T and polyamide 66/6T, and also polyamides which comprise cyclic diamines as comonomers. The polyamides generally have a relative viscosity of 2.0 to 5, determined on a 1 wt % strength solution in 96% strength sulfuric acid at 23° C., corresponding to a molecular weight (number average) of about 15 000 to 45 000.

Polyamides having a relative viscosity of 2.4 to 3.5, more particularly 2.5 to 3.4, are used with preference.

Mention may also be made, moreover, of polyamides obtainable, for example, by condensing 1,4-diaminobutane with adipic acid at elevated temperature (polyamide 4,6). Preparation processes for polyamides with this structure are described in, for example, EP-A 038 094, EP-A 038 582, and EP-A 039 524.

As to Component C

As component C, the thermoplastic molding compositions comprise 5 to 50 wt % of at least two different graft rubbers without olefinic double bonds (C1 and C2), with these graft rubbers C1 and C2 differing (at least) in the construction of the graft shell. In the molding compositions of the invention, component C is present frequently in an amount of 14 to 35, preferably 14 to 32 wt %. It is preferably halogen-free.

Graft rubbers in the sense of the invention are core-shell rubbers, which may also be of multishell construction. Graft rubbers preferred as components C1 and C2 are those having as their core (graft base) a component having a Tg of less than −20° C., preferably less than −40° C. Particularly suitable as C1 and C2 are rubbers based on acrylate, on siloxane, and on EPDM. The graft shell consists preferably of styrene and acrylonitrile and/or of other copolymerizable monomers. The ratio of hard phase to soft phase in the graft rubbers C1 and C2 is between 10:90 and 70:30 parts by weight. These graft rubbers may be prepared as described in WO 2001/42362. The graft shell (graft) of one graft rubber component consists frequently of styrene/acrylonitrile; the graft shell of the second graft rubber preferably comprises glycidyl methacrylate.

The first graft rubbers C1 are frequently composed of:
1) 40 to 80 wt %, preferably 50 to 70 wt % of a graft base composed of a rubber-elastic polymer based on alkyl acrylates having 1 to 8 C atoms in the alkyl radical, ethylene/propylene, dienes, or siloxanes, and having a glass transition temperature of below 0° C.;
2) 20 to 60 wt %, preferably 30 to 50 wt %, of a graft comprising:
21) 60 to 95 wt %, preferably 70 to 85 wt % of styrene or substituted styrenes of the general formula

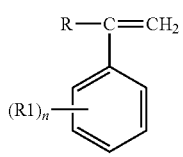

in which R is a $C_1$ to $C_8$ alkyl radical, preferably methyl or ethyl, or hydrogen, and $R^1$ is a $C_1$ to $C_8$ alkyl radical, preferably methyl or ethyl, and n has a value of 1, 2, or 3, or mixtures thereof, and 22) 5 to 40 wt %, preferably 15 to 30 wt % of at least one unsaturated nitrile, preferably acrylonitrile or methacrylonitrile, or mixtures thereof.

Polymers contemplated for the graft base are those whose glass transition temperature lies below −20° C. These are, for example, elastomers based on $C_1$ to $C_8$ alkyl esters of acrylic acid, and may optionally include further comonomers; or based on ethylene/propylene; or based on dienes such as butadiene; or based on siloxanes. The resulting graft rubber then comprises ASA, AES, ABS, or polysiloxane rubbers, respectively.

Preferred graft bases are those composed of:
11) 70 to 99.9 wt %, preferably from 69 to 79 wt % of at least one alkyl acrylate having 1 to 8 C atoms in the alkyl radical, preferably n-butyl acrylate and/or 2-ethylhexyl acrylate, more particularly n-butyl acrylate as sole alkyl acrylate
12) 0 to 30 wt %, more particularly 20 to 30 wt % of a further copolymerizable monoethylenically unsaturated monomer, such as butadiene, isoprene, styrene, acrylonitrile, methyl methacrylate, or vinyl methyl ether, or mixtures thereof
13) 0.1 to 5 wt %, preferably 1 to 4 wt % of a copolymerizable, polyfunctional, preferably di- or tri-functional monomer that brings about crosslinking, the sum of the components being 100 wt %.

Suitable such di- or polyfunctional crosslinking monomers are monomers which contain preferably two, optionally alternatively three or more, ethylenic double bonds capable of copolymerization, these double bonds not being conjugated in the 1,3-positions. Examples of suitable crosslinking monomers are divinylbenzene, diallyl maleate, diallyl fumarate, diallyl phthalate, triallyl cyanurate, or triallyl isocyanurate. The acrylic ester of tricyclodecenyl alcohol has proven a particularly favorable crosslinking monomer (cf. DE-A 12 60 135). This kind of graft bases is known from DE-A 31 49 358.

Among the grafts of the first graft rubber, preference is given to those in which there is styrene (or α-methylstyrene or mixtures thereof) on the one hand and acrylonitrile (or methacrylonitrile) on the other. Preferred monomer mixtures used are, in particular, styrene and acrylonitrile, or α-methylstyrene and acrylonitrile. The grafts are obtainable by copolymerization of the components.

Another preferred graft base is ASA rubber. Its preparation is known per se from DE-A 28 26 925, DE-A 31 49 358, and DE-A 34 14 118. The graft polymers may be prepared, for example, by the method described in DE-A 12 60 135.

The conditions of the graft polymerization are preferably selected such as to result in particle sizes of 50 to 800 nm ($d_{50}$ of the integral mass distribution). Measures for achieving this are known and are described in DE-A 28 26 925, for example. A seed latex process allows the direct preparation of a coarsely particulate rubber dispersion. In order to obtain very tough products, it is frequently an advantage to use a mixture of at least two graft polymers having different particle sizes. In order to achieve this, the particles of the rubber are enlarged in a known way, for example, by agglomeration, for example, such that the latex has a bimodal (50 to 180 nm and 200 to 800 nm) construction.

The polymerization of the hard phase is accompanied by formation of minor amounts of ungrafted fractions. These are generally ascribed to the hard phase.

Mixtures of different rubbers C1 are also frequently used. The mixing ratio of the two different rubbers is to be, for example, 10:90 to 90:10, with the rubbers possibly differing in respect of particle size, for example.

Component C2

As component C2, the intention is likewise to use core-shell graft rubbers, but in contrast to component C these rubbers are characterized by:
one or more graft shells based on acrylates or methacrylates, and
a fraction of 0.1 to 2, preferably 0.15 to 1.5, wt % of a monomer containing epoxide groups, in the outer graft shell.

A preferred monomer containing epoxide groups is glycidyl methacrylate.

Relative to the components C1 and C2, the fraction of C2 is generally at least 20, preferably 25 wt %.

As to Component D

As component D, the molding compositions of the invention comprise 1 to 25 wt % (often 2 to 10 wt %) of terpolymer based on styrene, acrylonitrile, and maleic anhydride. As component D, the thermoplastic molding compositions preferably comprise a styrene-acrylonitrile-maleic anhydride terpolymer and/or a styrene-N-phenylmaleimide-maleic anhydride terpolymer.

The fraction of acrylonitrile in the terpolymer, based on the overall terpolymer, is preferably 10 to 30 wt %, more preferably 15 to 30 wt %, more particularly 20 to 25 wt %. The copolymers generally have molecular weights $M_w$ in the range from 30 000 to 500 000 g/mol, preferably from 50 000 to 250 000 g/mol, more particularly from 70 000 to 200 000 g/mol, determined by GPC using tetrahydrofuran (THF) as eluent and with polystyrene calibration.

The copolymers may be prepared by radical polymerization of the corresponding monomers. The preparation is elucidated in more detail in, for example, WO 2005/040281, page 10, line 31 to page 11, line 8. Furthermore, styrene-N-phenylmaleimide-maleic anhydride terpolymers can also be used. Reference may further be made to the descriptions in EP-A-0 784 080 and also DE-A-100 24 935, and also to DE-A-44 07 485, where the component which is component B therein is described on pages 6 and 7.

As to Component E

As component E, the thermoplastic molding compositions of the invention comprise 2 to 30 wt % of at least one further rubber based on olefinic structural units, these rubbers being characterized in that they
a) do not have core-shell construction
b) contain at least 0.05 wt % of a functional group.

This component E is, for example, a rubber based on olefinic monomers without core-shell construction, and contains at least 0.05 wt % of functional monomers. The expression "based on" means that the greatest fraction of the rubber derives from olefinic monomers (at least 60 wt %, preferably at least 80 wt %, more particularly at least 90 wt %). The rubber often contains at least 0.1 wt % of functional monomers. These are monomers which include a functional group which are capable more particularly of formation of bonds with the polyamide of component B. The bonds formed are preferably covalent bonds. In the functional monomers, the functional groups present therein are preferably selected from carboxylic acid, carboxylic anhydride, carboxylic ester, carboxylic amide, carboxylic imide, amino, hydroxyl, epoxide, urethane, or oxazoline groups, or mixtures thereof.

Component E is preferably a copolymer of:
e1) 35 to 89.95 wt % of ethylene as component E1,
e2) 10 to 60 wt % of 1-octene, 1-butene, propene, or mixtures thereof, as component E2, and
e3) 0.05 to 5 wt % of functional monomers, the monomers carrying functional groups selected from carboxylic acid, carboxylic anhydride, carboxylic ester, carboxylic amide, carboxylic imide, amino, hydroxyl, epoxide, urethane, or oxazoline groups, or mixtures thereof, as component E3.

The fraction of the functional groups E3 is 0.1 to 5, preferably 0.2 to 4, and more particularly 0.3 to 3.5 wt %, based on the total weight of component E. Particularly preferred components E3 are composed of an ethylenically unsaturated monocarboxylic or dicarboxylic acid or of a functional derivative of such an acid.

Suitability is possessed in principle by all primary, secondary, and tertiary $C_1$-$C_{18}$ alkyl esters of acrylic acid or methacrylic acid, though esters having 1-12 C atoms, more particularly having 2-10 C atoms, are preferred. Examples thereof are methyl, ethyl, propyl, n-butyl, isobutyl, and tert-butyl, 2-ethylhexyl, octyl, and decyl acrylates, and the corresponding esters of methacrylic acid. Of these, n-butyl acrylate and 2-ethylhexyl acrylate are particularly preferred.

Instead of or in addition to the esters, the olefin polymers may also contain acid-functional and/or latently acid-functional monomers of ethylenically unsaturated monocarboxylic or dicarboxylic acids or monomers containing epoxy groups.

Further examples of monomers E3 include acrylic acid, methacrylic acid, tertiary alkyl esters of these acids, more particularly tert-butyl acrylate, and dicarboxylic acids such as maleic acid and fumaric acid, or derivatives of these acids, and also their monoesters.

The acid-functional or latently acid-functional monomers and the monomers containing epoxy groups are fixed preferably by radical grafting reaction to the polyolefin chain, by means, for example, of the addition of compounds of the following general formulae (I), (II), (Ill) and/or (IV).

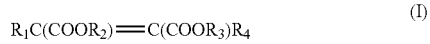

(I)

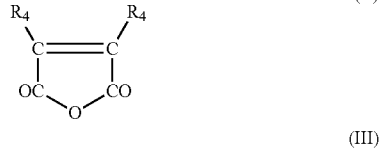

(II)

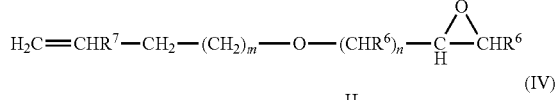

(III)

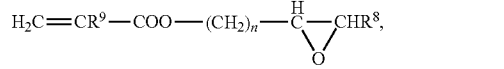

(IV)

where the radicals $R_1$-$R_4$ and $R^5$-$R^9$ represent hydrogen or alkyl groups having 1 to 6 C atoms, and m is an integer from 0 to 20, and n is an integer from 0 to 10. Hydrogen is preferred for $R_1$-$R_4$ and $R^5$-$R^7$, a value of 0 or 1 for m, and a value of 1 for n.

The corresponding compounds are, for example, maleic acid, fumaric acid, maleic anhydride, alkenyl glycidyl ether, and vinyl glycidyl ether. Preferred compounds of the formulae I, II, III, and IV are maleic acid and maleic anhydride as component E3, and epoxy-group-containing esters of acrylic acid and/or methacrylic acid, with glycidyl acrylate and glycidyl methacrylate being particularly preferred (as component E3).

Particularly preferred are olefin polymers of
50 to 89.8 wt % of ethylene, preferably 55 to 85.7,
10 to 50 wt % of 1-butene, preferably 14 to 44,
0.2 to 2 wt % of acrylic acid or maleic acid or maleic anhydride, preferably from 0.3 to 1 wt %,
or
40 to 69.9 wt % of ethylene, preferably 50 to 64.9,
30 to 60 wt % of 1-octene, preferably 35 to 49,
0.05 to 2 wt % of acrylic acid or maleic acid or maleic anhydride, preferably from 0.1 to 1 wt %.

The ethylene copolymers described above may be prepared by methods which are known per se, preferably by statistical copolymerization under high pressure and at elevated temperature. The molecular weight of these ethylene-α-olefin copolymers is between 10 000 and 500 000 g/mol, preferably between 15 000 and 400 000 g/mol (Mn, determined by GPC in 1,2,4-trichlorobenzene with PS calibration).

In one particular embodiment, ethylene-α-olefin copolymers are used that have been prepared with what are called "single site" catalysts. Further details can be found in U.S. Pat. No. 5,272,236. In this case, the ethylene-α-olefin copolymers have a molecular weight distribution which is narrow for polyolefins, of less than 4, preferably less than 3.5. Commercial products E used with preference are Exxelor® VA 1801 or 1803, Kraton® G 1901 FX, or Fusabond® N NM493 D, from the companies Exxon, Kraton, and DuPont, and also Tafiner® MH 7010 from the company Mitsui, and also Lupolen® KR 1270 from BASF.

Mixtures of the types of rubber set out above may also be used.

The functionalized rubbers of component E react in the melt with component B and are finely dispersed therein. Particular preference is given to EP rubbers grafted with acrylic acid or maleic anhydride, ethylene-acrylic acid copolymers, ethylene-octene-copolymers grafted with maleic anhydride, SEBS rubbers which have been grafted with maleic anhydride, and also ethylene-butene copolymers which have been grafted with maleic anhydride or acrylic acid.

As to Component F

As component F, the thermoplastic molding compositions of the invention may comprise one or more fibrous or particulate fillers or reinforcing materials. The amount is 0 to 50 wt %, often from 0 to 30 wt % of component F. Preferred fibrous fillers or reinforcing materials are carbon fibers, potassium titanate whiskers, aramid fibers, and very preferably glass fibers. Where glass fibers are used, they may have been treated with size and with an adhesion promoter for improved compatibility with the matrix material.

Generally speaking, the carbon fibers and glass fibers used have a diameter in the range of 6-20 μm. The glass fibers may be incorporated either in the form of short glass fibers or else in the form of continuous-filament strands (rovings). In the completed injection molding, the average length of the glass fibers is preferably in the range of 0.08-0.5 mm. Carbon fibers or glass fibers may also be used in the form of woven fabrics, mats, or glass silk rovings.

Suitable particulate fillers include amorphous silica, magnesium carbonate (chalk), powdered quartz, mica, talc, feldspar, glass beads, and more particularly calcium silicates such as wollastonite and kaolin (especially calcined kaolin).

Particularly preferred combinations of fillers are those of glass fibers and wollastonite.

As to Component G

As further component G, the molding composition may comprise further adjuvants, in an amount, for example, of 0 to 40 wt %, often 0 to 20 wt %. Examples thereof are flame retardants, dyes, pigments, or stabilizers, such as heat stabilizers or UV stabilizers, for example, and also lubricants or demolding aids. Heat stabilizers and UV stabilizers are often particularly important.

The molding compositions of the invention contain preferably less than 0.1 wt % of phthalic anhydride. With particular preference, however, the molding compositions contain no phthalic anhydride.

The invention also relates to a process for producing the above-described thermoplastic molding compositions, wherein components A to E and optionally F and G are mixed with one another in any order.

The molding compositions of the invention may be produced by conventional methods, such as by extrusion, for example. The molding compositions of the invention may be produced, for example, by mixing the starting components in customary mixing equipment such as screw extruders, preferably twin-screw extruders, Brabender mixers or Banbury mixers, and also kneaders, and subsequently extruding these mixtures. Following extrusion, the extrudate is cooled and comminuted. The sequence of mixing of the components can be varied, and hence two or possibly three components may be premixed, or else all of the components can be mixed jointly.

Intensive mixing is advantageous in order to maximize homogeneity of mixing. This generally necessitates average mixing times of 0.2 to 30 minutes at temperatures from 240 to 300° C., preferably 245 to 290° C. Following the extrusion, the extrudate is generally cooled and comminuted.

The molding composition of the invention are notable for improved weathering stability, very good notched impact strength at −30° C., and a low propensity to form surface defects. Surprisingly, the molding compositions of the invention also feature relatively low emissions behavior.

The examples and claims hereinafter elucidate the invention.

The intrinsic viscosity of the polyamides is determined to DIN 53 727 on 0.5 wt % strength solutions in 96 wt % sulfuric acid. The intrinsic viscosity of the styrene copolymers or terpolymers is determined in 0.5 wt % strength DMF solution at 25° C.

The Testing of the Molding Compositions

The heat distortion resistance of the samples was determined by means of the Vicat softening point. The Vicat softening point was determined to DIN 53 460, using a force of 49.05 N and a temperature rise of 50 K per hour, on ISO specimens. The notched impact strength of the products was determined on ISO specimens to ISO 179 1 eA (at −30° C. and RT).

The flowability was determined to ISO 1133 at 240° C. with 5 kg loading.

The fracture energy was determined to ISO 6603 on sheets (60×60×3 mm3) at −30° C. This was done using the total energy Wt. The sheets were fabricated at a melt temperature of 250° C. and a mold temperature of 60° C.

The quality of the surface was assessed on sheets with a size of 330 mm*120 mm*2 mm, which were produced at a melt temperature of 250° C. and a mold temperature of 60° C. The surface was assessed according to the school grade system (1: no tiger lines; 6: very many tiger lines). The emissions behavior was determined in the form of total C emission to VDA 277.

Component A Used

Styrene-acrylonitrile copolymer with 75 wt % styrene and 25 wt % acrylonitrile and an intrinsic viscosity of 80 ml/g (determined in 0.5 wt % strength DMF solution at 25° C.).

Component B1 Used

The polyamide used as B1 was a polyamide 6 obtained from g-caprolactam, with an intrinsic viscosity of 150 ml/g (measured at 0.5 wt % strength in 96% strength sulfuric acid), e.g., Ultramid® B 3.

Component B2 Used

The polyamide used as B2 was a polyamide 6 obtained from g-caprolactam, with an intrinsic viscosity of 130 ml/g (measured at 0.5 wt % strength in 96% strength sulfuric acid) and a triacetone diamine fraction of 0.16 wt %.

Component C11 Used

Graft rubber (finely divided), prepared from:
- β1) 16 g of butyl acrylate and 0.4 g of tricyclodecenyl acrylate, which were heated to 60° C. with stirring in 150 g of water with addition of 1 g of the sodium salt of a $C_{12}$-$C_{18}$ paraffin sulfonic acid, 0.3 g of potassium persulfate, 0.3 g of sodium hydrogencarbonate, and 0.15 g of sodium pyrophosphate. 10 minutes after the onset of the polymerization reaction, a mixture of 82 g of butyl acrylate and 1.6 g of tricyclodecenyl acrylate was added over the course of 3 hours. After the end of the addition of monomer, stirring was continued for an hour. The resulting latex of the crosslinked butyl acrylate polymer had a solids content of 40 wt %; the average particle size (weight average) was found to be 76 nm, and the particle size distribution was narrow (quotient Q=0.29).
- β2) 150 g of the polybutyl acrylate latex obtained according to β1) were mixed with 40 g of a mixture of styrene and acrylonitrile (75:25 weight ratio) and 60 g of water, and the resulting mixture was heated at 65° C. for 4 hours with stirring, following addition of a further 0.03 g of potassium persulfate and 0.05 g of lauroyl peroxide. After the end of the graft copolymerization, the polymerization product was precipitated from the dispersion by means of calcium chloride solution at 95° C., then washed with water and dried in a stream of warm air. The degree of grafting of the graft copolymer was 35%; the particle size is 91 nm.

Component C12 Used

Graft polymer (coarsely divided), prepared as follows:
- β3) an initial charge of 1.5 g of the latex prepared according to β1 was admixed over the course of 3 hours, at 60° C., following addition of 50 g of water and 0.1 g of potassium persulfate, with a mixture of 49 g of butyl acrylate and 1 g of tricyclodecenyl acrylate, and also with a solution of 0.5 g of the sodium salt of a $C_{12}$-$C_{18}$ paraffin sulfonic acid in 25 g of water. This was followed by polymerization for 2 hours. The resulting latex of the crosslinked butyl acrylate polymer had a solids content of 40%. The average particle size (weight average) of the latex was found to be 430 nm, and the particle size distribution was narrow (Q=0.1).
- β4) 150 g of the latex prepared according to β3 were mixed with 20 g of styrene and 60 g of water, and this mixture was heated at 65° C. for 3 hours with stirring, following addition of a further 0.03 g of potassium persulfate and 0.05 g of lauroyl peroxide. The dispersion obtained in this graft copolymerization was then polymerized for 4 hours more with 20 g of a mixture of styrene and acrylonitrile in a 75:25 weight ratio. The reaction product was then precipitated from the dispersion by means of a calcium chloride solution at 95° C., isolated, washed with water, and dried in a stream of warm air. The degree of grafting of the graft copolymer was found to be 35%; the average particle size of the latex particles was 510 nm.

Component C2 Used

Core-shell graft rubber, consisting of a core of crosslinked n-butyl acrylate and a shell consisting of methyl methacrylate and glycidyl methacrylate, with the weight ratio of core to shell being 70:30 and the fraction of glycidyl methacrylate in the shell being 0.5 wt %.

Component D Used

Used as component D was a styrene-acrylonitrile-maleic anhydride terpolymer which had a composition of 74.4/23.5/2.1 (wt %), intrinsic viscosity: 66 ml/g Component E Used Ethylene-1-butene copolymer with 67.9% ethylene, 31.6 wt % butene, and 0.5 wt % maleic acid for functionalization; for example, Tafmer® MH 7010 (from Mitsui, Japan).

Component E* Used

Compound of 80 parts of component B1 and 20 parts of E, prepared by melt compounding on a ZSK 30 apparatus at 250° C., with 10 kg/h throughput and 250 $min^{-1}$ speed.

The Preparation of the Molding Compositions of the Invention

The components were mixed in a twin-screw extruder at a melt temperature of 240° C. to 260° C. The melt was passed through a waterbath and pelletized. The results of the tests are listed in table 1.

TABLE 1

| | Molding composition | | | | | | | |
|---|---|---|---|---|---|---|---|---|
| | C1 | C2 | C3 | C4 | 5 | 6 | 7 | 8 |
| A | 19 | 19 | 19 | 14 | 19 | 19 | 14 | 14 |
| B1 | 41 | 41 | — | — | 41 | — | — | — |
| B2 | — | — | 41 | 41 | — | 41 | 41 | 41 |
| C11 | — | 31 | 31 | 24 | 21 | 21 | 14 | — |
| C12 | 31 | — | — | — | — | — | — | 14 |
| C2 | — | — | — | — | 10 | 10 | 10 | 10 |
| D1 | 5 | 5 | 5 | 5 | 5 | 5 | 5 | 5 |
| E | 4 | 4 | 4 | — | 4 | 4 | — | — |
| E* | — | — | — | 16 | — | — | 16 | 16 |
| Vicat B [° C.] | 103 | 103 | 102 | 115 | 102 | 102 | 115 | 115 |
| MVI [ml/10'] | 28.6 | 26.9 | 48.7 | 69.4 | 25.6 | 47.6 | 68.7 | 70.2 |
| ak, RT [kJ/m$^2$] | 34.1 | 43.5 | 51.1 | 66.2 | 56.1 | 68.2 | 67.5 | 61.6 |
| ak, −30° C. [kJ/m$^2$] | 7.6 | 7.3 | 6.9 | 8.9 | 11.3 | 12.3 | 13.1 | 12.4 |
| Wt, −30° C. [Nm] | 56.1 | 46.2 | 49.2 | 66.1 | 66.1 | 69.5 | 65.2 | 67.1 |
| tiger-lines | 2 | 2 | 1.5 | 1.5 | 2 | 1.5 | 1.5 | 1.5 |
| C emission [mg/kg] | 21 | 22 | 22 | 18 | 14 | 13 | 10 | 9 |

The molding composition of the invention therefore have an improved notched impact strength at −30° C. Surprisingly, the products of the invention also exhibit a relatively low emissions tendency.

The invention claimed is:

1. A thermoplastic molding composition consisting essentially of the following components:
   A) 3 to 77 wt % of one or more styrene copolymers, as component A,
   B) 15 to 89 wt % of one or more polyamides, as component B,
   C) 5 to 50 wt % of two or more graft rubbers without olefinic double bonds in the rubber phase, as component C, wherein the graft base core of the two or more graft rubbers is based on elastomers selected from the group consisting of elastomers based on $C_1$ to $C_8$ alkyl esters of acrylic acid, ethylene/propylene, or siloxanes, wherein the two or more graft rubbers comprise a first graft rubber C1 and a second graft rubber C2, wherein:
      the first graft rubber C1 has a graft shell comprising 60 to 95 wt % of styrene or α-methylstyrene or mixtures thereof and 5 to 40 wt % of at least one unsaturated nitrile, and
      the second graft rubber C2 has a graft shell based on acrylates or methacrylates, and a fraction of 0.1 to 2 wt % of a monomer containing epoxide groups, in the outer graft shell,
   D) 1 to 25 wt % of a terpolymer of styrene, acrylonitrile, and maleic anhydride, as component D,
   E) 2 to 30 wt % of rubber based on olefinic monomers, as component E,
   F) 0 to 50 wt % of fibrous or particulate filler or mixtures thereof, as component F,
   G) 0 to 40% of further adjuvants, as component G,
   the wt % being based in each case on the total weight of components A to G and together making 100 wt %.

2. The thermoplastic molding composition as claimed in claim 1, consisting essentially of:
   A) 10 to 70 wt % of one or more styrene copolymers, as component A,
   B) 20 to 60 wt % of one or more polyamides, as component B,
   C) 14 to 35 wt % of two or more graft rubbers without olefinic double bonds in the rubber phase, as component C, wherein the graft base core of the two or more graft rubbers is based on elastomers selected from the group consisting of elastomers based on C1 to C8 alkyl esters of acrylic acid, ethylene/propylene, or siloxanes,
   D) 2 to 10 wt % of a terpolymer of styrene, acrylonitrile, and maleic anhydride, as component D,
   E) 3 to 30 wt % of rubber based on olefinic monomers, as component E,
   F) 0 to 50 wt % of fibrous or particulate filler or mixtures thereof, as component F,
   G) 0 to 40% of further adjuvants, as component G,
   where the mixture used as component C) consists of at least two different graft rubbers which differ in their graft shells, the first graft rubber of component C) having a graft shell of styrene and acrylonitrile, and the second graft rubber of component C) having a graft shell which comprises glycidyl methacrylate.

3. The thermoplastic molding composition as claimed in claim 1, consisting essentially of:
   A) 10 to 70 wt % of a SAN copolymer, as component A,
   B) 20 to 60 wt % of one or more polyamides, as component B,
   C) 14 to 35 wt % of two or more graft rubbers without olefinic double bonds in the rubber phase, as component C, wherein the graft base core of the two or more graft rubbers is based on elastomers selected from the group consisting of elastomers based on C1 to C8 alkyl esters of acrylic acid, ethylene/propylene, or siloxanes, D) 2 to 10 wt % of a styrene-acrylonitrile-maleic anhydride terpolymer as component D, E) 3 to 30 wt % of rubber based on olefinic monomers, as component E, F) 0 to 50 wt % of fibrous or particulate filler or mixtures thereof, as component F, G) 0 to 40% of further adjuvants, as component G, where the mixture used as component C) consists of at least two different graft rubbers which differ only in their graft shells.

4. The thermoplastic molding composition as claimed in claim 1, characterized in that the average particle diameter of component C is between 50 to 800 nm.

5. The thermoplastic molding composition as claimed in claim 1, characterized in that two different rubber components are used as component C, at least one of the rubbers having a bimodal particle size distribution.

6. The thermoplastic molding composition as claimed in claim 1, characterized in that the first graft rubber of component C has a graft shell of styrene and acrylonitrile, and the second graft rubber of component C has a graft shell which comprises glycidyl methacrylate.

7. The thermoplastic molding composition as claimed in claim 1, characterized in that component B has from 0.05 to 0.5 wt % of triacetonediamine (TAD) end groups.

8. The thermoplastic molding composition as claimed in claim 1, characterized in that it comprises two graft rubbers as component C), and the first graft rubber of component C) has a graft shell of styrene and acrylonitrile, and the second graft rubber has a graft shell which consists of glycidyl methacrylate and methyl methacrylate.

9. A process for producing thermoplastic molding compositions as claimed in claim 1, characterized in that components A, B, C, D, and E, and also optionally F and G, are mixed with one another in any order at temperatures of 100 to 300° C. under a pressure of 1 to 50 bar and the mixture is subsequently kneaded and extruded.

10. A process for producing a thermoplastic molding composition, wherein the thermoplastic molding composition comprises the following components:

A) 3 to 77 wt % of one or more styrene copolymers, as component A,

B) 15 to 89 wt % of one or more polyamides, as component B,

C) 5 to 50 wt % of two or more graft rubbers without olefinic double bonds in the rubber phase, as component C, wherein the graft base core of the two or more graft rubbers is based on elastomers selected from the group consisting of elastomers based on $C_1$ to $C_8$ alkyl esters of acrylic acid, ethylene/propylene, or siloxanes, D) 1 to 25 wt % of a terpolymer of styrene, acrylonitrile, and maleic anhydride, as component D, E) 2 to 30 wt % of rubber based on olefinic monomers, as component E, F) 0 to 50 wt % of fibrous or particulate filler or mixtures thereof, as component F, G) 0 to 40% of further adjuvants, as component G, the wt % being based in each case on the total weight of components A to G and together making 100 wt %, wherein components A, B, C, D, and E, and also optionally F and G, are mixed with one another in any order at temperatures of 100 to 300° C. under a pressure of 1 to 50 bar and the mixture is subsequently kneaded and extruded, and wherein a part of component D is first premixed with a part of component B to form a masterbatch in a ratio of 1:1 to 1:2 and said masterbatch is subsequently mixed with further components A, B, C, D, and E, and also optionally F and G, to give the thermoplastic molding composition.

11. Moldings, fibers, or foils comprising or consisting of a thermoplastic molding composition as claimed in claim 1.

* * * * *